(12) United States Patent
Zaifman et al.

(10) Patent No.: US 11,381,637 B2
(45) Date of Patent: Jul. 5, 2022

(54) REMOTE LATENCY CALLS FOR LATENCY CLUSTERED COMPUTE INSTANCES

(71) Applicant: Verizon Patent and Licensing Inc., Basking Ridge, NJ (US)

(72) Inventors: Art Zaifman, Millburn, NJ (US); Kirk Campbell, Long Valley, NJ (US); Raghuram Parvataneni, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 62 days.

(21) Appl. No.: 16/993,324

(22) Filed: Aug. 14, 2020

(65) Prior Publication Data

US 2022/0053048 A1    Feb. 17, 2022

(51) Int. Cl.
*G06F 15/173* (2006.01)
*H04L 67/10* (2022.01)
*G06F 9/448* (2018.01)
*H04L 67/289* (2022.01)

(52) U.S. Cl.
CPC .............. *H04L 67/10* (2013.01); *G06F 9/448* (2018.02); *H04L 67/289* (2013.01)

(58) Field of Classification Search
CPC ........ H04L 67/10; H04L 67/289; G06F 9/448
See application file for complete search history.

(56) References Cited

U.S. PATENT DOCUMENTS

2019/0394096 A1* 12/2019 Bernat ................. G06F 16/2365
2021/0136177 A1*  5/2021 Hall ....................... H04L 67/327

\* cited by examiner

*Primary Examiner* — Wing F Chan
*Assistant Examiner* — Joseph R Maniwang

(57) ABSTRACT

A device receives, from a first compute instance, a Remote Latency Call, that includes a target round trip time (RTT), a function, and one or more arguments for the function. The device determines, responsive to the Remote Latency Call, a first cluster of compute instances that satisfies the target RTT. The device migrates code associated with the function to a second compute instance within the first cluster of compute instances, and passes the arguments to the second compute instance for execution of the function.

20 Claims, 8 Drawing Sheets

REMOTE LATENCY CALLS FOR LATENCY CLUSTERED COMPUTE INSTANCES

BACKGROUND

Edge computing may involve a cloud-based Information Technology (IT) service environment located at an edge of a network. One of the purposes of edge computing is to enable high-bandwidth, low-latency access to latency-sensitive applications distributed at the edge of the network closest to the user. A primary goal of edge computing is to reduce network congestion and improve application performance by executing task processing closer to end users thereby improving the delivery of content and applications to the end users and reducing transport costs for high bandwidth services. Applications where edge computing is highly desirable may include on-line gaming, augmented reality (AR), virtual reality (VR), wirelessly connected vehicles, and Internet of Things (IoT) applications (e.g., industry 4.0 applications). Additionally, edge computing can be beneficial in large public venues and enterprise organizations where venue or enterprise services are delivered to onsite consumers from an edge server located at or near the venue or organization. In such large-scale use cases, data content may be locally produced, stored, processed, and/or delivered from an edge server, thus, ensuring reduced backhaul, low latency, or even ultra-low latency. Multi-Access Edge Computing is one type of edge computing. Multi-Access Edge Computing moves the processing, storing, and/or delivery of traffic and services from a centralized network to a data center(s) at the edge of the network, closer to the end user.

DETAILED DESCRIPTION OF THE PREFERRED EMBODIMENTS

Figure 1:
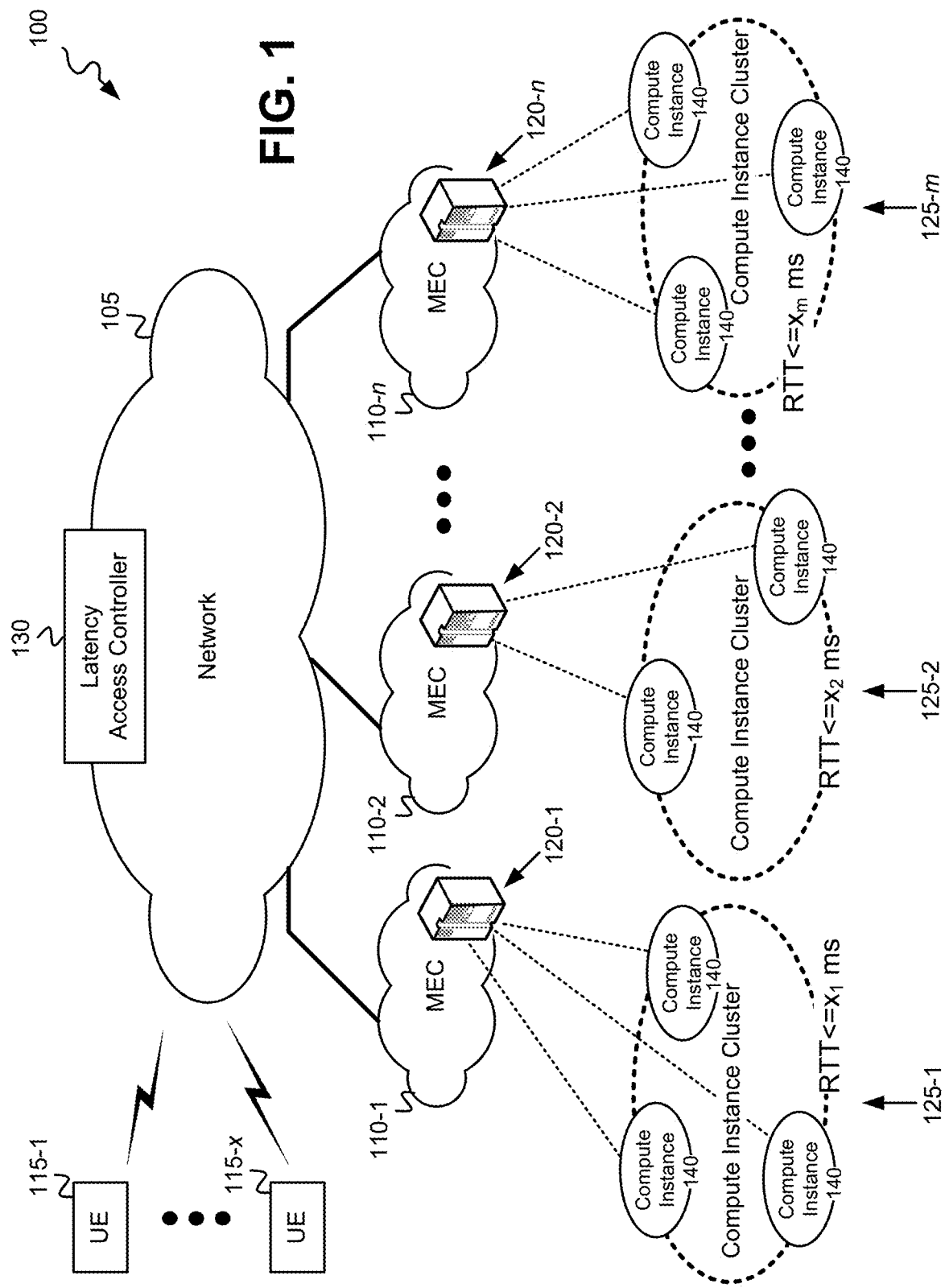
FIG. 1 depicts an exemplary network environment in which compute instances may issue remote latency calls between one another for the remote execution of particular functions involving a target round trip time.

The following detailed description refers to the accompanying drawings. The same reference numbers in different drawings may identify the same or similar elements. The following detailed description does not limit the invention.

Exemplary implementations described herein organize and cluster compute instances by a latency measure(s) associated with each of the compute instances, and enable remote latency calls to be issued from first compute instances for the latency-dependent migration of functions to second compute instances in other compute instance clusters. A "compute instance," as used herein, refers to any type of application executing in any type of operating system on any type of computational device or system (e.g., client, server), or any type of virtual machine (VM). A VM includes a software-based emulation of a physical computer. In one exemplary embodiment, the latency measure may include a round trip time (RTT) associated with each compute instance. RTT, as referred to herein, includes a sum of network delays in both directions between session endpoints (e.g., between a first compute instance and a second compute instance), including the sum of all encoding, queueing, processing, decoding, and propagation delays in both directions of the session. The compute instances may be implemented by different Multi-Access Edge Computing networks that have different propagation and processing delays. As described herein, the compute instances may be organized into different compute instance clusters based on, for example, an upper bound on the RTT for each compute instance. A RTT class may then be assigned to each compute instance cluster for subsequent use in identifying a particular compute instance cluster for migrating a function requiring a specific level of latency performance.

In implementations described herein, a latency access controller may act as an intermediary device for handling remote latency calls from compute instances that request migration of a function(s) to a different compute instance cluster that has a particular level of latency performance (e.g., a particular RTT upper-bound). For example, a first compute instance in a first compute instance cluster may identify a function to be executed as a critical or latency sensitive function requiring a better latency performance than can be provided by the first compute instance. In this circumstance, the first compute instance issues a Remote Latency Call to the latency access controller that includes a target RTT, the function to be executed, and values for the arguments of the function. Upon receipt of the Remote Latency Call, the latency access controller identifies a RTT class that satisfies the target RTT, and further determines a compute instance cluster that has been assigned to the RTT class. The latency access controller then migrates code for the function to a second compute instance in the determined compute instance cluster. The second compute instance executes the migrated function while satisfying the desired RTT performance.

FIG. 1 depicts an exemplary network environment 100 in which compute instances may issue remote latency calls between one another for the remote execution of particular functions involving a target RTT. Network environment 100 may include a network 105, one or more Multi-access Edge Computing networks 110 (referred to herein as a "MEC 110" or "MECs 110"), and multiple user equipment devices (UEs) 115-1 through 115-x (referred to herein as a "UE 115" or "UEs 115").

Network 105 may include one or more networks of various types including, for example, a wireless network, a Public Switched Telephone Network (PSTN), a Local Area Network (LAN), a wide area network (WAN), a metropolitan area network (MAN), an intranet, and/or the Internet. The wireless network may include a Public Land Mobile Network (PLMN) and/or a wireless LAN or WAN (e.g., Wi-Fi). As shown, a latency access controller 130 may connect to, or reside within, network 105. Latency access controller 130 may include a network device that, among other operations, operates as a software compiler that compiles software instructions for MECs 110. In some implementations, latency access controller 130 may further cluster compute instances 140 by one or more latency measures (e.g., by RTT) and assign a RTT class, of multiple RTT classes, to each compute instance cluster based on the RTT. For example, three compute instances comp_inst_1, comp_inst_2, and comp_inst_3 may each involve a RTT of 10 milliseconds (ms) or less and may be clustered in a same compute instance cluster, which may then be assigned to RTT_class_2.

MECs 110 may each include one or more devices networked together. MECs 110 may each include, for example, a secure gateway, a server, and/or an MEC hosting infrastructure that enables applications and services to be hosted near a particular geographic region to ensure low latency of traffic and services to that geographic region. Each of the MECs 110 may be installed in close proximity to certain locations or venues, such as close to smart infrastructure or large-scale venues (e.g., a sporting or concert arena, a theme park, etc.), so as to minimize traffic latency. MECs 110 may host different types of applications and services that process traffic from UEs 115. As shown, each MEC 110 may host multiple compute instances 140 that may be organized into a cluster of compute instances 140.

As shown in FIG. 1, MEC 110-1 includes at least one server 120-1, MEC 110-2 includes at least one server 120-2, and MEC 110-$n$ includes at least one server 120-$n$. As further shown, server 120-1 may host and execute a cluster 125-1 of compute instances 140 that process traffic from UEs 115 with a RTT of less than or equal to $x_1$ ms. Server 120-2 may host and execute a cluster 125-2 of compute instances 140 that process traffic from UEs 115 with a RTT of less than or equal to $x_2$ ms. Server 120-$n$ may host and execute a cluster 125-$m$ of compute instances 140 that process traffic from UEs 115 with a RTT of less than or equal to $x_m$ ms. Each cluster 125 of compute instances 140 may include at least one compute instance residing on a respective server 120.

UEs 115 may each include any type of electronic device having a wired or wireless communication capability. UEs 115 may include, for example, a laptop, palmtop, desktop, or tablet computer; a personal digital assistant (PDA); a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user (not shown) may carry, use, administer, and/or operate each UE 115.

The configuration of components of network environment 100 in FIG. 1 is for illustrative purposes. Other configurations may be implemented. Therefore, network environment 100 may include additional, fewer and/or different components/devices/networks that may be configured in a different arrangement from that depicted in FIG. 1.

Figure 2:
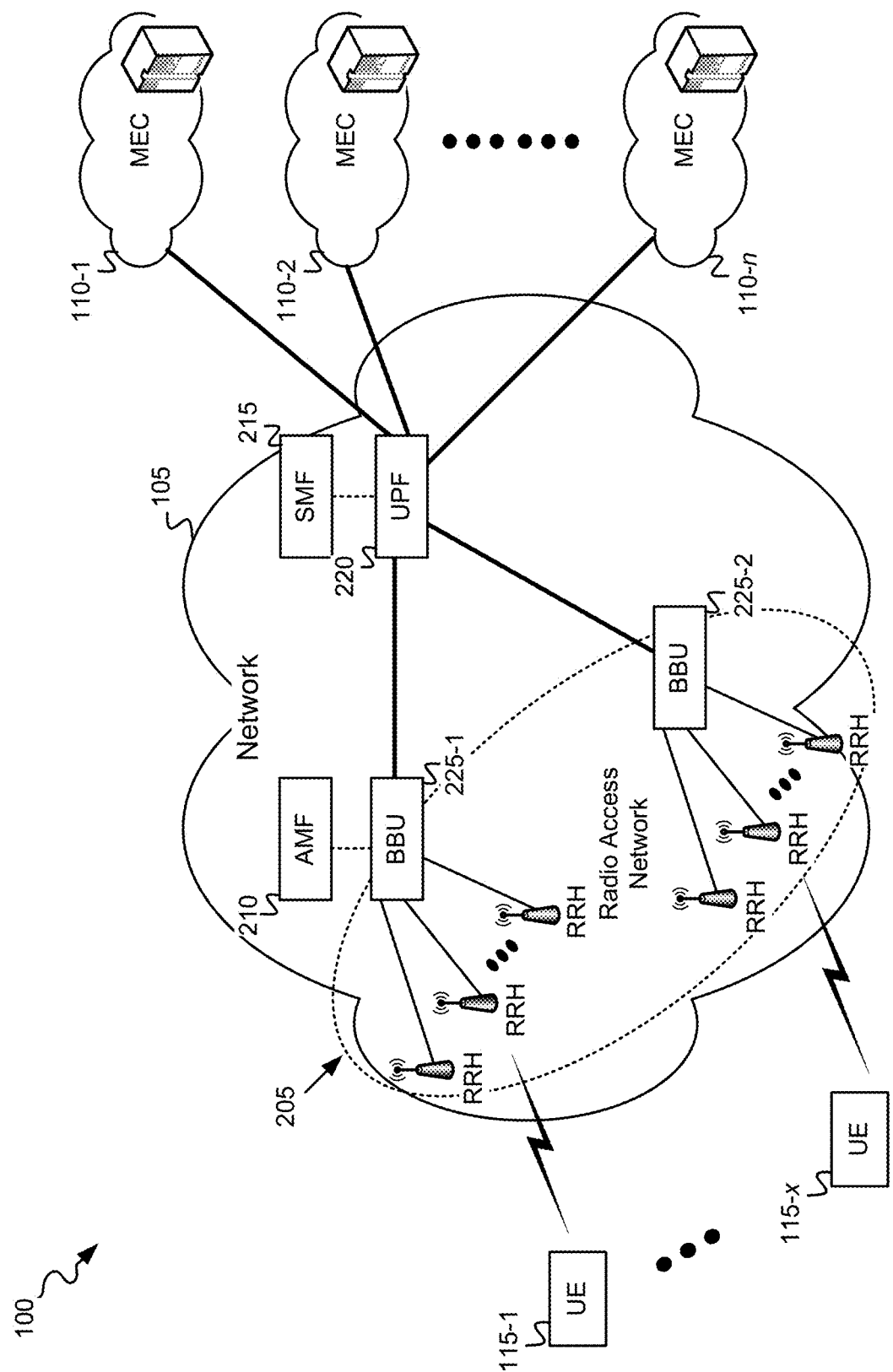
FIG. 2 illustrates the network environment of FIG. 1 in an exemplary implementation in which the network includes a Fifth Generation wireless network.

FIG. 2 illustrates the network environment 100 of FIG. 1 in an exemplary implementation in which network 105 includes a Fifth Generation (5G) wireless network 105. Wireless network 105 may include a Radio Access Network (RAN) 205 and other 5G network components, such as an Access & Mobility Function (AMF) 210, a Session Management Function (SMF) 215, and a User Plane Function (UPF) 220.

AMF 210 may perform connection management, mobility management, access authentication and authorization, and/or security management. SMF 215 may perform session management (e.g., session establishment, modification, and release), allocate network addresses to UEs 115, and select and control the UPF 220 for data transfer. UPF 220 performs packet routing and forwarding, packet inspection, and Quality of Service (QoS) handling. UPF 220 may act as a router and a gateway between network 105 and an external data network (not shown) and may forward session data between the external data network and RAN 205, or between MECs 110 and RAN 205. Network 105 may include multiple UPFs 220 disposed at various geographic locations in network 105 (only a single UPF 220 is shown for purposes of simplicity).

RAN 205 may provide wireless network access to UEs 115 and may include, among other components, at least one base-band unit (BBU) (two BBUs 225-1 and 225-2 are shown by way of example) and multiple remote radio heads (RRHs) for providing a radio communication interface to UEs 115 that subscribe to wireless network service from network 105. A "base station" of RAN 205 may include a BBU 225 connected to a RRH, and the RRH may connect to an antenna array of a tower of the base station. As shown in FIG. 2, multiple RRHs can connect to each BBU 225 and each BBU 225, in turn, connects to a UPF 220.

The configuration of wireless network components of wireless network 105 shown in FIG. 2 is for illustrative purposes. Other configurations may be implemented. Therefore, the wireless network 105 may include additional, fewer and/or different components that may be configured in a different arrangement than that depicted in FIG. 2. Though a 5G wireless network 105 is shown, other types of wireless networks, having different components than shown in FIG. 2, may be used within the network environment 100. For example, wireless network 105 may include a Fourth Generation (4G) wireless network or a hybrid 4G/5G wireless network.

Figure 3:
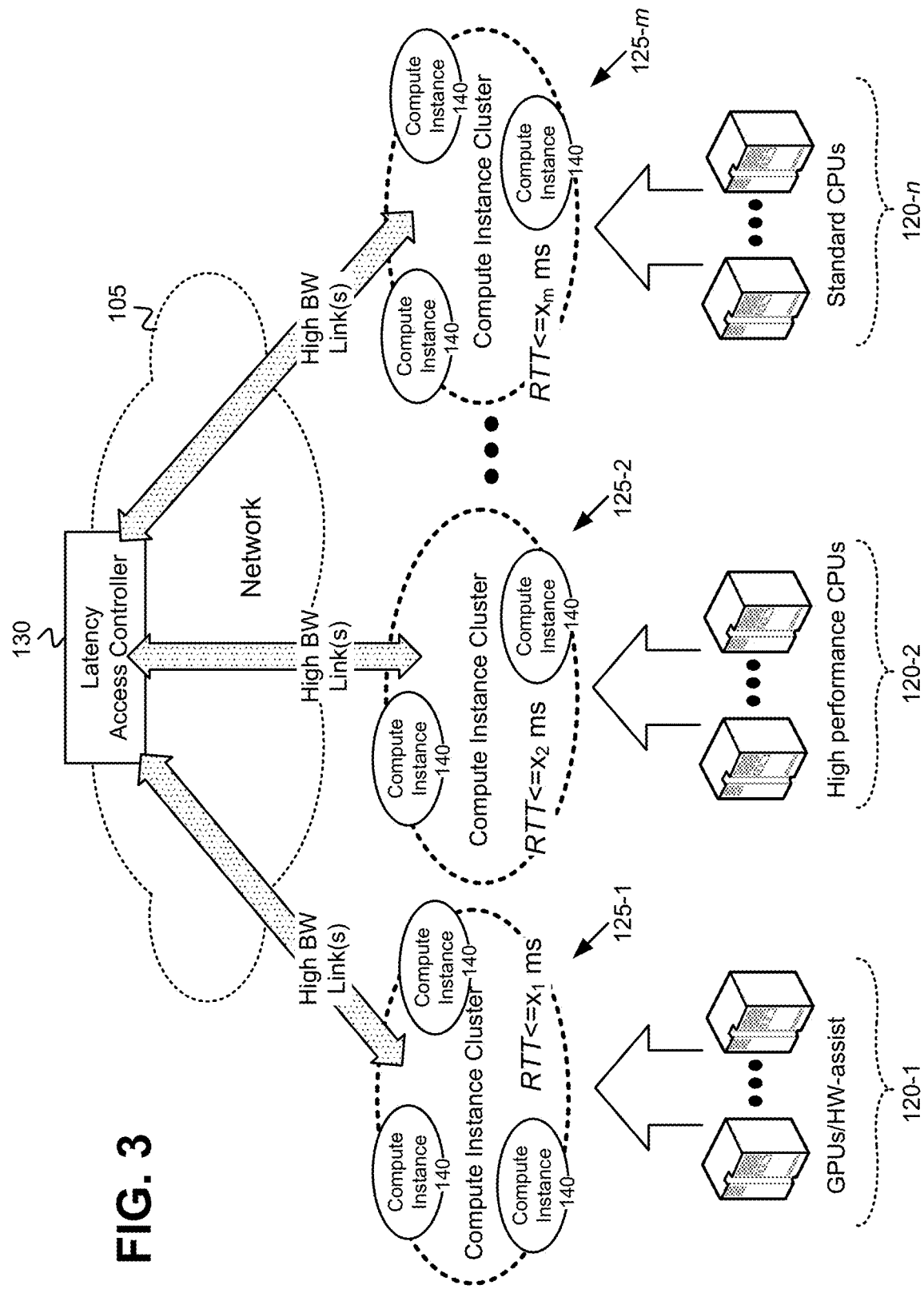
FIG. 3 depicts an example of the implementation of compute instances by different servers having different levels of processing speed, and the clustering of those compute instances based on round trip time.

FIG. 3 depicts an example of the implementation of compute instances 140 by different servers having different levels of processing speed, and the clustering of those compute instances 140 based on RTT. As shown, latency access controller 130 may connect to multiple different compute instance 140 clusters via a high bandwidth (BW) link(s) (e.g., greater than or equal to 100 Gigabits per second (Gbps)) over network 105. Latency access controller 130 may determine a RTT associated with each compute instance 140 based on the performance of RTT measurements. The RTT measurements may be performed directly by latency access controller 130, or by an independent network device that supplies a record of the RTT measurements to controller 130. Latency access controller 130, or another network device or entity, may then cluster the compute instances 140 by RTT. The compute instances 140 having a low RTT of less than or equal to $x_1$ ms may be clustered in a first compute instance cluster 125-1. The compute instances 140 having a slower RTT of less than or equal to $x_2$ ms (where $x_2 > x_1$) may be clustered in a second compute instance cluster 125-2. The compute instances 140 having an even slower RTT of less than $x_m$ ms (where $x_m > x_2 > x_1$) may be clustered in an $m^{th}$ compute instance cluster 125-$m$ (where m is greater than or equal to two).

Multiple servers 120, or multiple groups of servers 120, may execute particular compute instances 140. A server 120-1, or group of servers 120-1, may include multiple Graphics Processing Units (GPUs) and may additionally include different types of hardware assistance and/or processing offloading engines. Server(s) 120-1 may, thus, execute compute instances 140 with a fast processing speed and each compute instance 140 may have the low RTT of $x_1$ ms. A server 120-2, or group of servers 120-2, may include high performance Central Processing Units (CPUs), high performance input/output (I/O) devices, and/or highly optimized inference engines. Server(s) 120-2 may, therefore, execute compute instances 140 with the slower RTT of $x_2$ ms, where $x_2 > x_1$. A server 120-n, or group of servers 120-n, may include standard CPUs and may, therefore, execute compute instances 140 with the even slower RTT of $x_m$ ms, where $x_m > x_2 > x_1$.

Figure 4:
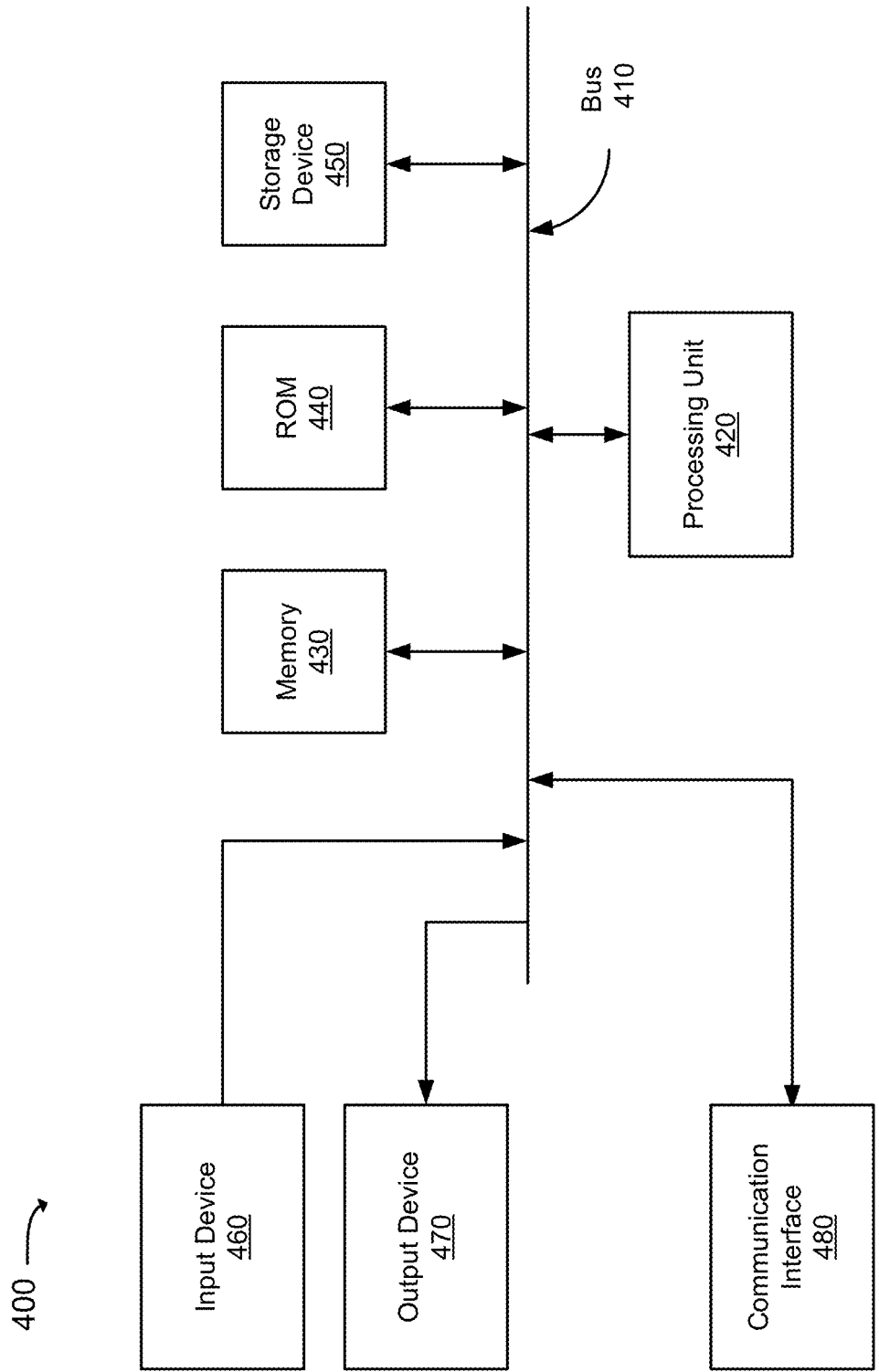
FIG. 4 is a diagram that depicts exemplary components of a network device that may correspond to the user equipment devices, latency access controller, and/or servers of FIG. 1.

FIG. 4 is a diagram that depicts exemplary components of a network device 400. UEs 115, latency access controller 130, and each server 120 may include at least one device configured similarly to network device 400, possibly with some variations in components and/or configuration. Network device 400 may include a bus 410, a processing unit 420, a main memory 430, a read only memory (ROM) 440, a storage device 450, an input device 460, an output device 470, and a communication interface 480. Bus 410 may include a path that permits communication among the elements of network device 400.

Processing unit 420 may include one or more processors or microprocessors which may interpret and execute instructions, or processing logic that may perform certain operations. In some implementations, processing unit 420 may include one or more GPUs. In other implementations, processing unit 420 may include one or more high performance CPUs or one or more standard CPUs. Memory 430 may include a random access memory (RAM) or another type of dynamic storage device that may store information and instructions for execution by processing unit 420. Read Only Memory (ROM) 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "non-transitory computer-readable medium" or a "non-transitory storage medium."

Input device 460 may include one or more mechanisms that permit an operator (or user) to input information to network device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Communication interface 480 may include one or more transceivers that enable network device 400 to communicate with other devices and/or systems. For example, communication interface 480 may include a wired or wireless transceiver for communicating with other network devices 400 of a same compute instance cluster, other network devices 400 of a different compute instance cluster, or other devices (e.g., latency access controller 130), via network 105.

The configuration of components of network device 400 in FIG. 4 is for illustrative purposes. Other configurations may be implemented. Therefore, network device 400 may include additional, fewer and/or different components, or differently arranged components, from those depicted in FIG. 4.

Figure 5:
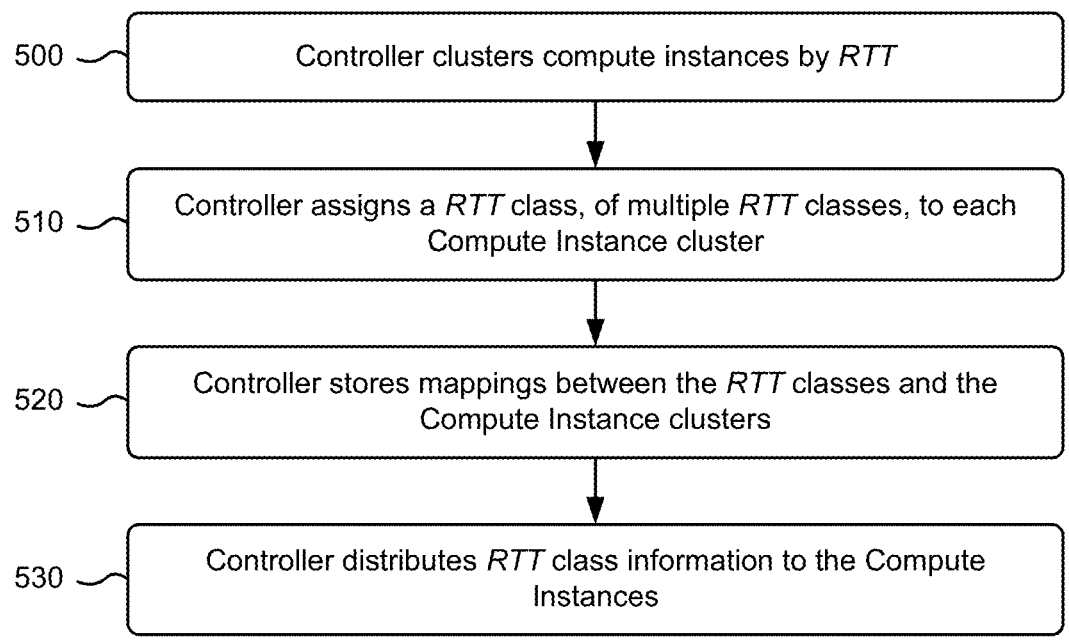
FIG. 5 illustrates an exemplary process for clustering compute instances by a latency measure and assigning compute instance clusters to latency classes.

FIG. 5 illustrates an exemplary process for clustering compute instances 140 by a latency measure, such as RTT, and assigning compute instance clusters to latency classes. The exemplary process of FIG. 5 may be implemented, for example, by latency access controller 130 and is described below with respect to the example of FIG. 6. The exemplary process of FIG. 5 is described below as using the latency measure of RTT for each compute instance 140. Other latency measures, however, may alternatively be used. Though the process of FIG. 5 is described as being performed by latency access controller 130, the process may alternatively be performed by another network device or entity connected to network 105.

The exemplary process includes latency access controller 130 clustering compute instances 140 by RTT (block 500). Latency access controller 130 may obtain a measure of RTT for each compute instance 140 residing, for example, in MECs 110-1 through 110-n. The RTT measurement may be performed by latency access controller 130 or by another network device or entity. Latency access controller 130 analyzes and compares the RTT measures for the compute instances 140 to determine maximum RTT values (RTT upper bounds) for each compute instance cluster of multiple compute instance clusters. For example, referring to the example of FIG. 6, latency access controller 130 may identify compute instances 140 having an RTT of less than or equal to 5 ms, and may group them together in a first cluster 125-1. Latency access controller 130 may further identify compute instances 140 having an RTT of less than or equal to 10 ms and may group them together in a second cluster 125-2. Latency access controller 130 may also identify compute instances 140 having an RTT of less than or equal to 15 ms and may group them together in a third cluster 125-3. Latency access controller 130 may additionally identify compute instances 140 having an RTT of less than or equal to 20 ms and may group them together in a fourth cluster 125-4.

Figure 6:
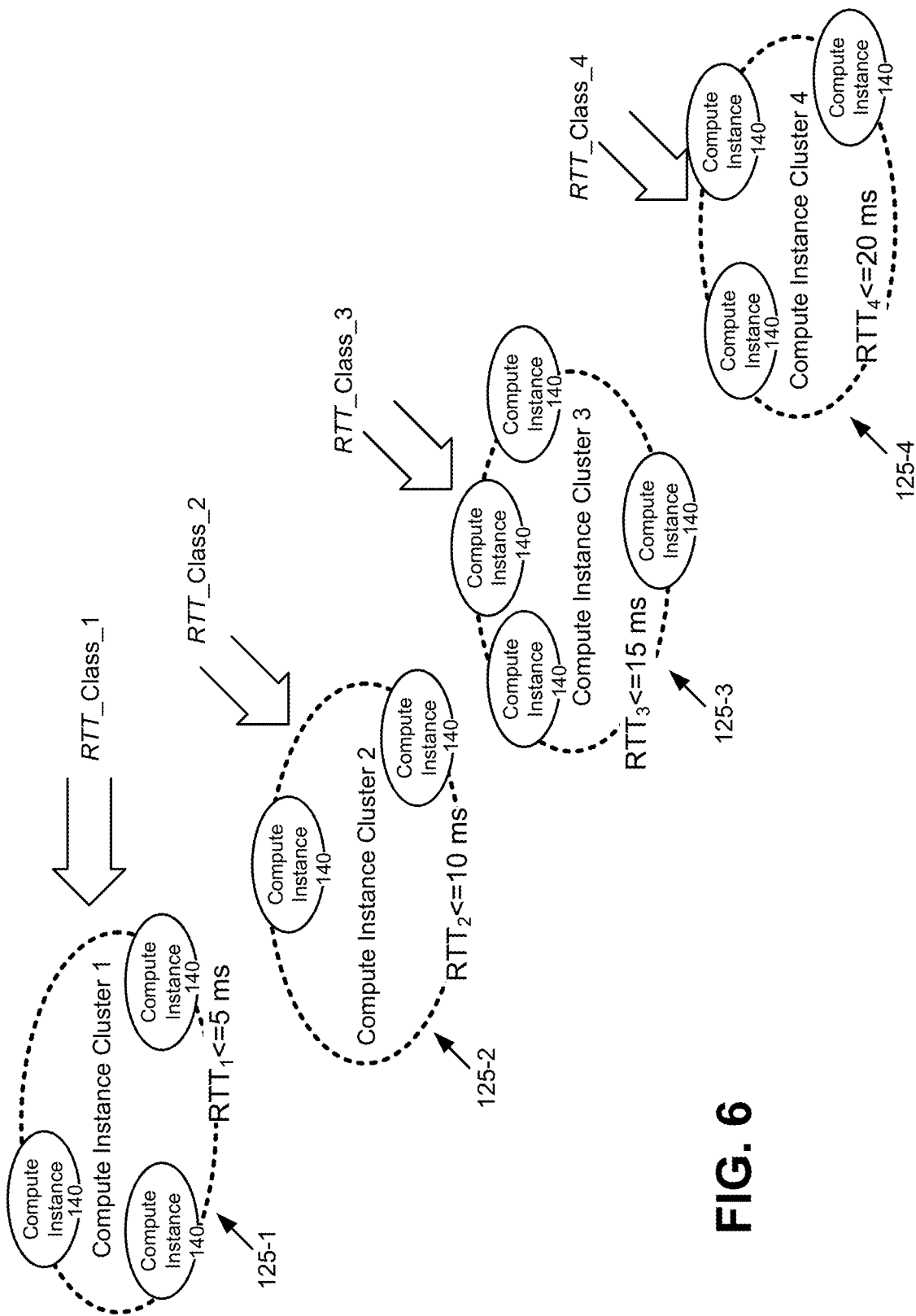
FIG. 6 illustrates an example of the clustering of compute instances of the exemplary process of FIG. 5.

The latency access controller 130 assigns a RTT class, of multiple RTT classes, to each compute instance cluster (block 510). Latency access controller 130 may generate multiple RTT class labels for the multiple compute instance clusters. For example, latency access controller 130 may generate a RTT_Class_1 label, a RTT_Class_2 label, a RTT_Class_3 label, and a RTT_Class_4 label and may assign each RTT class to a different compute instance cluster. As shown in the example of FIG. 6, RTT_Class_1 is assigned to compute instance cluster 125-1 that includes compute instances having a $RTT_1$ of less than or equal to 5 ms. RTT_Class_2 is further assigned to compute instance cluster 125-2 that includes compute instances 140 having a $RTT_2$ of less than or equal to 10 ms. RTT_Class_3 is also assigned to compute instance cluster 125-3 that includes compute instances 140 having a $RTT_3$ of less than or equal to 15 ms. RTT_Class_4 is additionally assigned to compute instance cluster 125-4 that includes compute instances 140 having a $RTT_4$ of less than or equal to 20 ms.

The latency access controller 130 stores mappings between the RTT classes and the compute instance clusters in memory (block 520). The mappings may associate each of the RTT classes and the compute instances 140 of the cluster that has been assigned to a respective RTT class. The mappings permit controller 130 to retrieve, from memory, one or more compute instances 140 by mapping a RTT class to the one or more compute instances 140 of a particular compute instance cluster. Referring to the example of FIG. 6, latency access controller 130 may store mappings between RTT_Class_1 and the compute instances 140 of cluster 125-1, between RTT_Class_2 and the compute instances 140 of cluster 125-2, between RTT_Class_3 and the compute instances 140 of cluster 125-3, and between RTT_Class_4 and the compute instances 140 of cluster 125-4.

The latency access controller 130 distributes the RTT class information to the compute instances 140 (block 530). Controller 130 may, for example, broadcast, via network 105, a message that includes the RTT class information, including RTT class labels and the corresponding RTT levels, for the computer instance clusters. Upon receipt of the message, each compute instance 140 may locally store the RTT class information for use in making remote latency calls.

The exemplary process of FIG. 5 may be executed for initially clustering multiple compute instances 140 hosted and executed by multiple different servers 120. After the initial clustering, the process of FIG. 5 may be repeated when new compute instances 140 are created, or when old compute instances 140 are removed.

Figure 7:
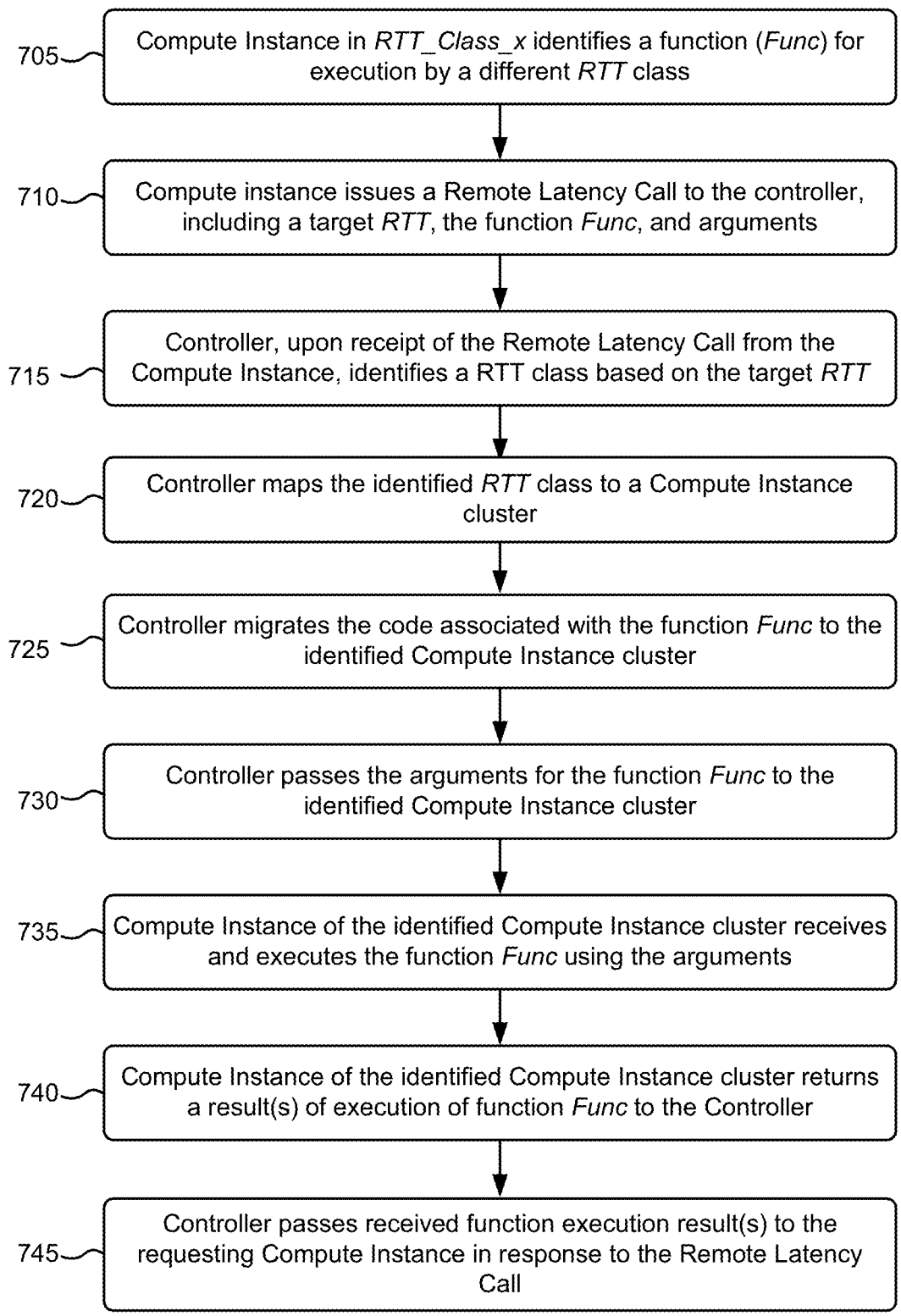
FIG. 7 illustrates an exemplary process for issuing and processing a remote latency call to migrate a function to a compute instance within a compute instance cluster having a different latency than the call-issuing compute instance.

FIG. 7 illustrates an exemplary process for issuing and processing a remote latency call to migrate a function to a compute instance 140 within a compute instance cluster having a different latency than the call-issuing compute instance 140. The exemplary process of FIG. 7 may be implemented by a first compute instance 140 in cooperation with latency access controller 130 and a second compute instance 140. The exemplary process of FIG. 7 is described below with reference to the examples of FIGS. 6 and 8.

Figure 8:
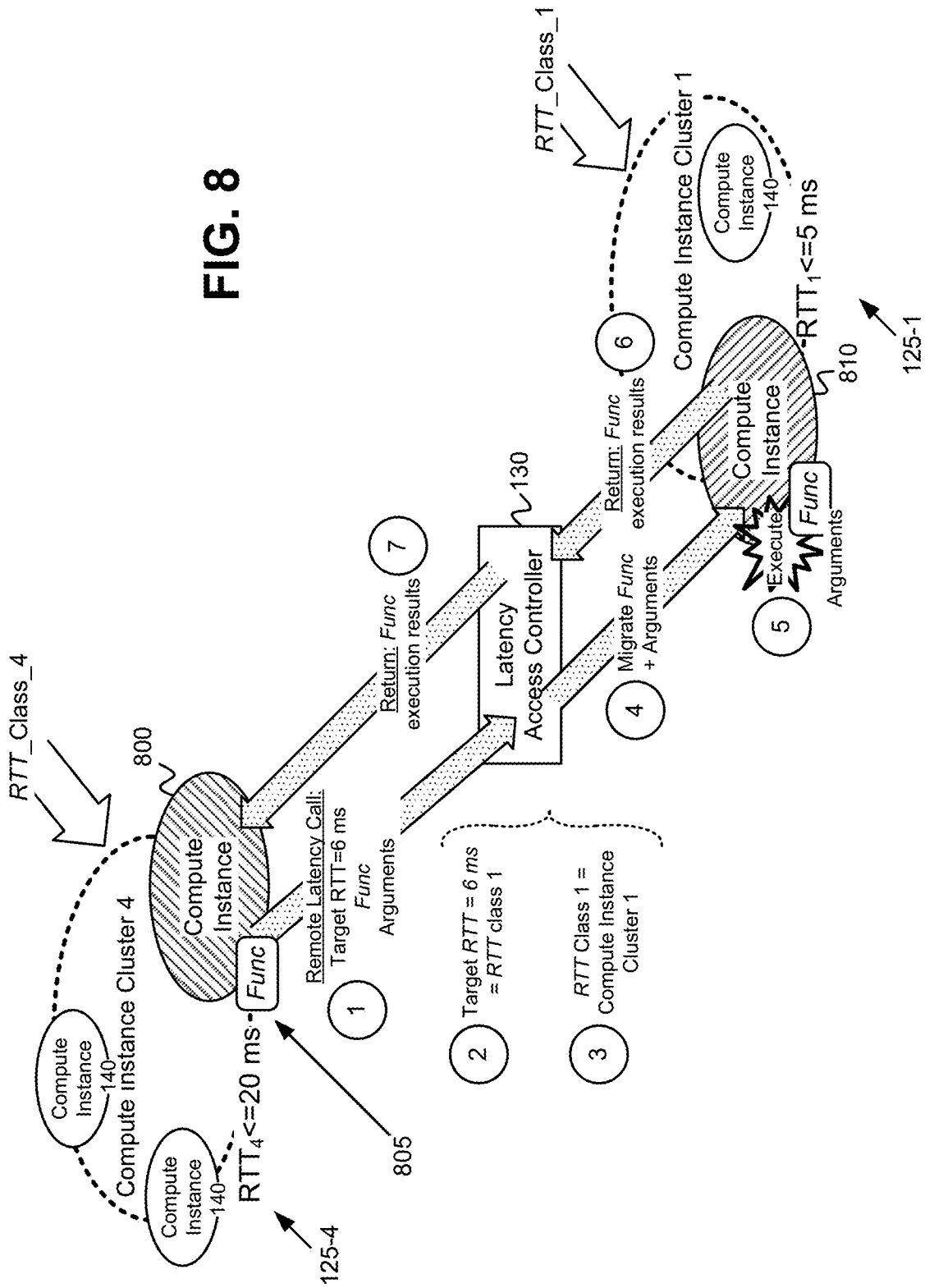
FIG. 8 illustrates an example of the exemplary process of FIG. 7.

The exemplary process includes a first compute instance 140 in a RTT class RTT_Class_x identifying a function (Func) for execution by a different RTT class (block 705). The first compute instance 140 may, for example, identify the function Func as a critical or latency-sensitive function that requires a better latency performance than can be provided by the first compute instance 140 itself, or by any other compute instance within the local compute instance cluster 125. In another example, first compute instance 140 may have a low latency and may already be performing a critical or latency-sensitive function(s) and the function Func may be a latency insensitive function. In this example, first compute instance 140 may offload performance of the function Func to another compute instance cluster to minimize the processing load by the first compute instance 140. In the example of FIG. 8, a compute instance 800, a member of compute instance cluster 125-4 that is assigned to RTT_Class_4, identifies a function Func 805 that requires a different latency than that provided by compute instance 800. In the example shown, compute instance 800 has a RTT of less than or equal to 20 ms, whereas the function Func to be executed requires a RTT of less than or equal to 5 ms.

The first compute instance 140 issues a Remote Latency Call to the latency access controller 130, including a target RTT, the function Func, and arguments (block 710). The first compute instance 140 generates a message that serves as the Remote Latency Call, where the message includes a field that indicates the target RTT value, a field or block that stores the code of the function Func, and a field or block that stores the arguments for input to execution of the function. In one implementation, the first compute instance 140 may execute a function call in the following form: Migrate (latency, Func, Args), where "Migrate" is a function that causes the Remote Latency Call to be issued to the latency access controller 130, "Latency" is a target latency measure (e.g., RTT) that is requested for the function Func, "Func" is the function to be migrated to another compute instance having a different latency (e.g., RTT) performance, and "Args" are the one or more arguments to be used as inputs to the function Func when executed after migration. The example of FIG. 8 depicts compute instance 800 issuing a Remote Latency Call (identified with a "1" within a circle) with a target RTT equal to 5 ms, the function Func, and arguments for Func.

The latency access controller 130, upon receipt of the Remote Latency Call from the compute instance 140, identifies a RTT class based on the target RTT (block 715). When the Remote Latency Call is received from the issuing compute instance 140, latency access controller 130 extracts the target RTT, the function Func, and the arguments. Controller 130 then compares the extracted target RTT with the known RTTs associated with the multiple RTT classes. The known RTT for each of the multiple RTT classes may include a RTT upper-bound that guarantees a maximum response time associated with execution of the function Func. The latency access controller 130 identifies the RTT class that will satisfy the target RTT performance requirement. For example, referring to the example of FIG. 6, RTT_Class_4 is associated with a RTT of less than or equal to 20 ms, RTT_Class_3 is associated with a RTT of less than or equal to 15 ms, RTT_Class_2 is associated with a RTT of less than or equal to 10 ms, and RTT_Class_1 is associated with a RTT of less than or equal to 5 ms. Using the example of FIG. 6, if the target RTT from the Remote Latency Call is 6 ms, then controller 130 identifies RTT_Class_1 as being needed to meet the latency requirement of 6 ms. FIG. 8 depicts controller 130 identifying (identified with a "2" within a circle) RTT_Class_1 based on the target RTT of 6 ms.

The latency access controller 130 maps the identified RTT class to a compute instance cluster 125 (block 720). Controller 130 consults the stored mappings between the RTT classes and the compute instance clusters (stored in block 520 above) to map the identified RTT class to the compute instance cluster. Referring to the example of FIG. 6, if the identified class (identified in block 715 above) is RTT_Class 2, then controller 130 maps the RTT class to compute instance cluster 125-2. FIG. 8 further shows controller 130 mapping (identified with a "3" within a circle) RTT_Class_1 to compute instance cluster 125-1.

The latency access controller 130 migrates the code associated with the function Func to the identified compute instance cluster (block 725) and passes the arguments for the function Func to the identified compute instance cluster (block 730). In one implementation, the latency access controller 130 may execute a function call in the following form: Migrate (Latency Class, Func, Args), where "Migrate" is a function that causes the function "Func" to be uploaded to a compute instance 140 that is a member of a cluster associated with the requested "Latency Class," and "Args" are the one or more arguments to be used as inputs to the function Func when executed after migration. Upon execution of the "Migrate" function, latency access controller 130 uploads the code for the function Func to a compute instance 140 within the identified compute instance cluster 125. The particular compute instance 140 may be selected by controller 130 among the compute instances within the identified compute instance cluster 125, may be selected by a selection policy (e.g., a round-robin selection policy), may be selected based on a current processing load per compute instance 140 in the identified compute instance cluster 125, or may be selected by one or more compute instances 140 within the identified compute instance cluster 125 itself. The example of FIG. 8 shows controller 130 migrating (identified with a "4" within a circle) the function Func to compute instance cluster 125-1 and also passing the arguments for the function.

A second compute instance 140, of the compute instance cluster identified by the latency access controller 130, receives and executes the function Func using the arguments (block 735). The second compute instance 140, upon receipt of the function Func from controller 130, stores the function and then executes the function using the received arguments. The example of FIG. 8 shows compute instance 810 of compute instance cluster 125-1 executing (identified with a "5" within a circle) the migrated function Func using the arguments passed from controller 130.

The second compute instance 140 of the identified compute instance cluster 125 returns a result(s) of execution of the function Func to the latency access controller 130 (block 740), and latency access controller 130 then passes the received function result(s) to the requesting compute instance 140 in response to the Remote Latency Call (block 745). Blocks 740 and 745 may be performed in cases where the result(s) of execution of the function Func is needed for execution of another function(s) at the compute instance 140 that issued the Remote Latency Call. In other circumstances, blocks 740 and 745 may be omitted where the issuing compute instance 140 does not require the result(s) of execution of the function Func. FIG. 8 shows compute instance 810 returning (identified with a "6" within a circle) the results of execution of the migrated function Func to controller 130, and controller 130, in turn, returns (identified with a "7" within a circle) the function execution results to the compute instance 800 that originally issued the remote latency call.

The exemplary process of FIG. 7 may be repeated for each Remote Latency Call to be issued from a first compute instance 140 to latency access controller 130 to request the migration, and execution, of a function by a second compute instance 140 in a different RTT class.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 7, and sequences of operations, messages, and data flows with respect to FIG. 8, the order of the blocks and/or the operations, messages, and data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 415) of a device.

A non-transitory storage medium includes one or more of the storage mediums described in relation to memory/storage 430/450. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
at least one communication interface configured to receive, from a first compute instance, a Remote Latency Call, that includes a target round trip time (RTT), a function, and one or more arguments for the function; and
a processor configured to:
identify an RTT associated with each compute instance of a plurality of compute instances,
cluster the plurality of compute instances into multiple clusters of compute instances based on each compute instance's identified RTT,
determine, responsive to the Remote Latency Call, a first cluster of compute instances from the multiple clusters of compute instances that satisfies the target RTT, migrate, via the at least one communication interface, code associated with the function to a second compute instance within the first cluster of compute instances, and pass the one or more arguments to the second compute instance for execution of the function.

2. The device of claim 1, wherein the second compute instance executes within a Multi-Access Edge Computing network (MEC).

3. The device of claim 1, wherein, when determining the first cluster of compute instances that satisfies the target RTT, the processor is further configured to:

identify a first RTT class, of multiple RTT classes, based on the target RTT, and map the identified first RTT class to the first cluster of compute instances.

4. The device of claim 1, wherein the processor is further configured to:

assign multiple RTT classes to the multiple clusters of compute instances.

5. The device of claim 1, wherein the first compute instance has a first RTT and wherein the second compute instance has a second RTT that is less than or equal to the target RTT.

6. The device of claim 1, wherein the processor is further configured to:

receive one or more results of execution of the function from the second compute instance; and pass the one or more results to the first compute instance.

7. The device of claim 1, wherein the processor is further configured to:

assign an RTT class, of multiple RTT classes, to each compute instance cluster of the multiple clusters of compute instances, and wherein determining the first cluster of compute instances that satisfies the target RTT is based on the assigned RTT class for each compute instance cluster.

8. A method, comprising:

identifying a round trip time (RTT) associated with each compute instance of a plurality of compute instances;

clustering the plurality of compute instances into multiple clusters of compute instances based on each compute instance's identified RTT;

receiving, from a first compute instance, a Remote Latency Call, that includes a target RTT, a function, and one or more arguments for the function;

determining, responsive to the Remote Latency Call, a first cluster of compute instances from the multiple clusters of compute instances that satisfies the target RTT;

migrating code associated with the function to a second compute instance within the first cluster of compute instances; and passing the one or more arguments to the second compute instance for execution of the function.

9. The method of claim 8, wherein the second compute instance executes within a Multi-Access Edge Computing network (MEC).

10. The method of claim 8, wherein determining the first cluster of compute instances that satisfies the target RTT further comprises:

identifying a first RTT class, of multiple RTT classes, based on the target RTT; and mapping the identified first RTT class to the first cluster of compute instances.

11. The method of claim 8, further comprising:

assigning multiple RTT classes to the multiple clusters of compute instances.

12. The method of claim 8, wherein the first compute instance has a first RTT and wherein the second compute instance has a second RTT that is less than or equal to the target RTT.

13. The method of claim 8, further comprising:

receiving one or more results of execution of the function from the second compute instance; and passing the one or more results to the first compute instance.

14. The method of claim 8, further comprising:

assigning an RTT class, of multiple RTT classes, to each compute instance cluster of the multiple clusters of compute instances, and wherein determining the first cluster of compute instances that satisfies the target RTT is based on the assigned RTT class for each compute instance cluster.

15. A non-transitory storage medium storing instructions executable by a device with one or more processors, wherein execution of the instructions causes the device to:

identify a round trip time (RTT) associated with each compute instance of a plurality of compute instances;

cluster the plurality of compute instances into multiple clusters of compute instances based on each compute instance's identified RTT;

receive, from a first compute instance, a Remote Latency Call that includes a target RTT, a function, and one or more arguments for the function;

determine, responsive to the Remote Latency Call, a first cluster of compute instances from the multiple clusters of compute instances that satisfies the target RTT;

migrate code associated with the function to a second compute instance within the first cluster of compute instances; and pass the one or more arguments to the second compute instance for execution of the function.

16. The non-transitory storage medium of claim 15, wherein the second compute instance executes within a Multi-Access Edge Computing network (MEC).

17. The non-transitory storage medium of claim 15, wherein, when determining the first cluster of compute instances that satisfies the target RTT, execution of the instructions further causes the device to:

identify a first RTT class, of multiple RTT classes, based on the target RTT; and map the identified first RTT class to the first cluster of compute instances.

18. The non-transitory storage medium of claim 15, wherein execution of the instructions further causes the device to:

assign multiple RTT classes to the multiple clusters of compute instances.

19. The non-transitory storage medium of claim 15, wherein the first compute instance has a first RTT and wherein the second compute instance has a second RTT that is less than or equal to the target RTT.

20. The non-transitory storage medium of claim 15, wherein execution of the instructions further causes the device to:

assign an RTT class, of multiple RTT classes, to each compute instance cluster of the multiple clusters of compute instances, and wherein determining the first cluster of compute instances that satisfies the target RTT is based on the assigned RTT class for each compute instance cluster.

\* \* \* \* \*